PIEZOELECTRIC TRANSDUCER

Filed June 27, 1952

3 Sheets-Sheet 1

INVENTORS: W. P. MASON
B. T. MATTHIAS
BY N. S. Ewing
ATTORNEY

INVENTORS: W. P. MASON
B. T. MATTHIAS
BY N. D. Ewing
ATTORNEY

Feb. 16, 1954 W. P. MASON ET AL 2,669,666

PIEZOELECTRIC TRANSDUCER

Filed June 27, 1952 3 Sheets-Sheet 3

INVENTORS: W. P. MASON
B. T. MATTHIAS

BY N. S. Ewing

ATTORNEY

Patented Feb. 16, 1954 2,669,666

UNITED STATES PATENT OFFICE 2,669,666

PIEZOELECTRIC TRANSDUCER

Warren P. Mason, West Orange, and Bernd T. Matthias, Fanwood, N. J., assignors to Bell Telephone Laboratories, Incorporated, New York, N. Y., a corporation of New York Application June 27, 1952, Serial No. 295,952

12 Claims. (Cl. 310—8.0)

This invention relates in general to piezoelectric crystal apparatus and, more particularly, to such apparatus including piezoelectric materials of tetrazonal-scalenohedral lattice structure.

Electromechanical transducers comprising crystalline elements of the form mentioned are adapted for numerous industrial applications, some involving translation of applied electrical energy into mechanical energy as in the case of sonic or supersonic projectors, and others involving translation of energy from mechanical to electrical form as in the case of microphones, supersonic receivers, and phonograph pickups. In some applications resonance of the crystalline element plays a major or significant role as in a piezoelectric resonator employed in or as an electromechanical filter or as the frequency-determining element of an oscillation generator.

One object of the invention is to increase the energy level at which a transducer of the kind described can operate without fracture.

Another object is to reduce the effect of temperature changes on the frequency characteristics of such a transducer, and more particularly to provide a transducer that is little affected by temperature changes within the usual range of room temperature variations.

The present invention is based, in part, on the discovery that ammonium-$d_4$ deuterium phosphate as crystallized in the scalenohedral-tetragonal form is piezoelectrically active in a practically significant sense; that it shares most if not all of the properties that have recommended such materials as $NH_4H_2PO_4$ ("ADP") for practical use; and that it is superior in various important respects that will be pointed out hereinafter. For notable example, the temperature coefficient of frequency of one of the principal crystal cuts, namely the 45 degree Z-cut, is zero at a temperature (5° C.) so close to room temperature that a transducer comprising this material operates with a high degree of frequency stability though exposed to room temperature variations. It has been discovered, further, that the frequency stability can be even further improved by the addition of up to five per cent of thallium.

The ammonium-$d_4$ deuterium phosphate transducer of the present invention has still further advantages associated with the relatively high piezoelectric coupling constants that the material is found to have. These advantages include low circuit impedance, greater band width in filter applications, and a marked increase in mechanical power output capacity.

We have discovered also that certain other anti-ferroelectric substances isomorphous with ammonium-$d_4$ deuterium phosphate are piezoelectric to a significant degree and are adaptable to the same uses as those disclosed herein for ammonium-$d_4$ deuterium phosphate. These other substances, however, are substantially inferior to ammonium-$d_4$ deuterium phosphate for practical applications. They are rubidium deuterium phosphate, $RbD_2PO_4$; ammonium-$d_4$ deuterium arsonate, $ND_4D_2AsO_4$; and rubidium deuterium arsonate, $RbD_2AsO_4$. The members of the group are characterized by the general chemical formula $XD_2YO_4$, where X is a material selected from the group consisting of $ND_4$ and Rb; and Y is a material selected from the group consisting of P and As.

Other objects, features, and advantages of the present invention will be apparent from a study of the following detailed description and the attached drawings in which.

Figure 3A:
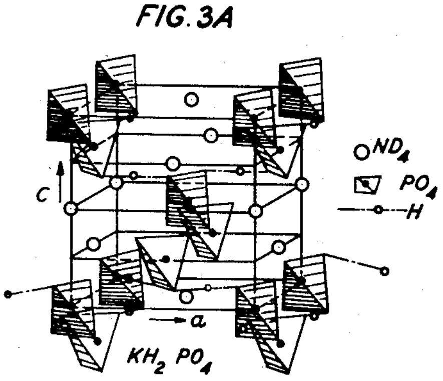
Figure 3B:
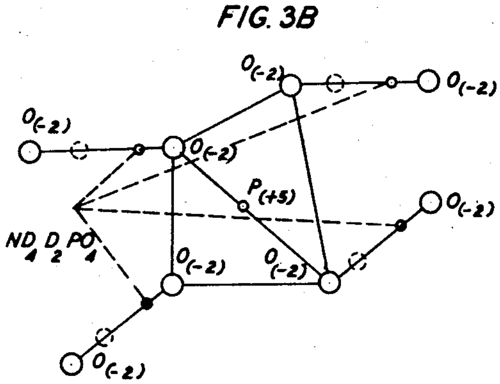
Figures 4A, 4B, 5A, 5B:
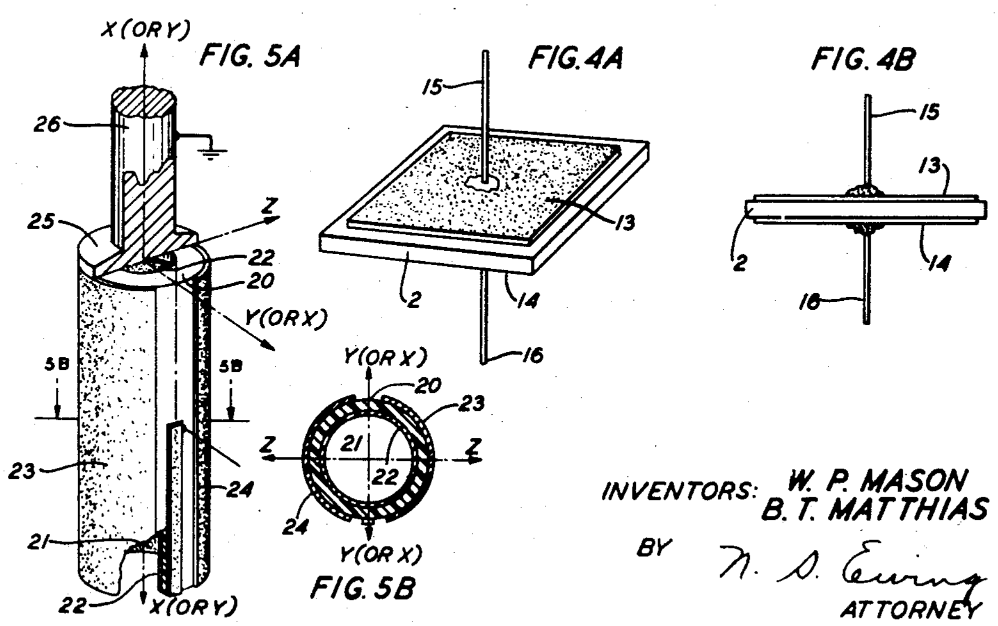
Figure 6C:
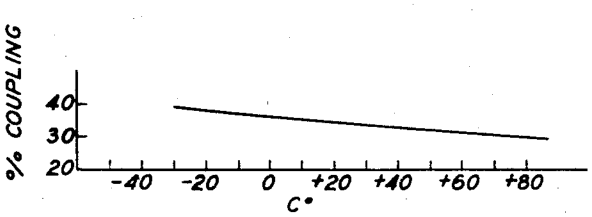
Figure 6B:
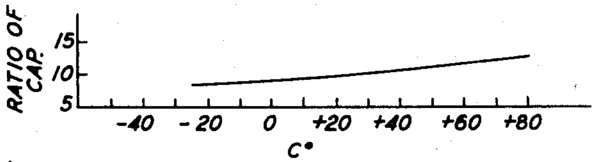
Figure 6A:
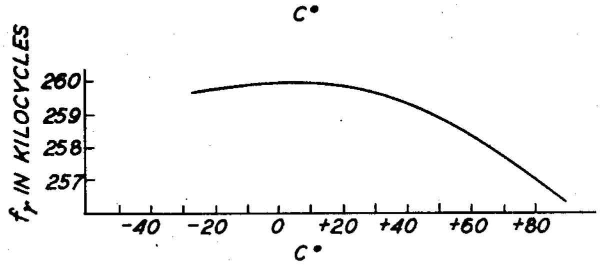
Figure 7C:
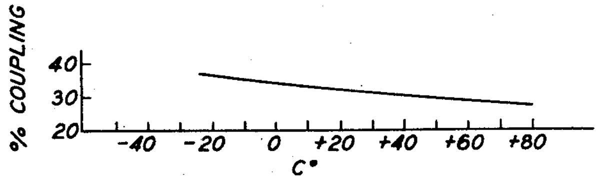
Figure 7B:
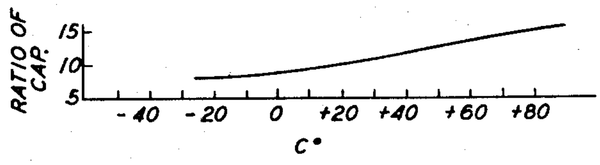
Figure 7A:
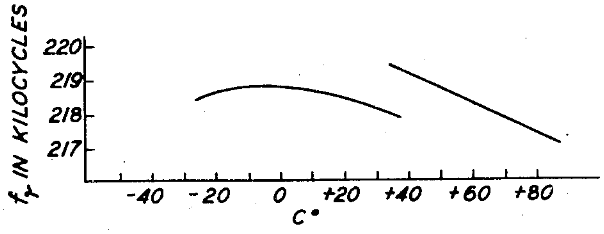
Figure 8:
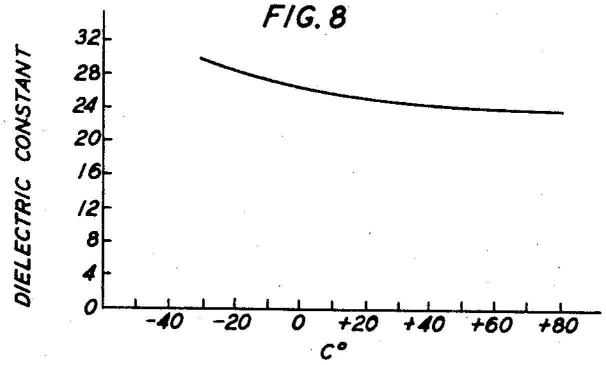
Figure 9:
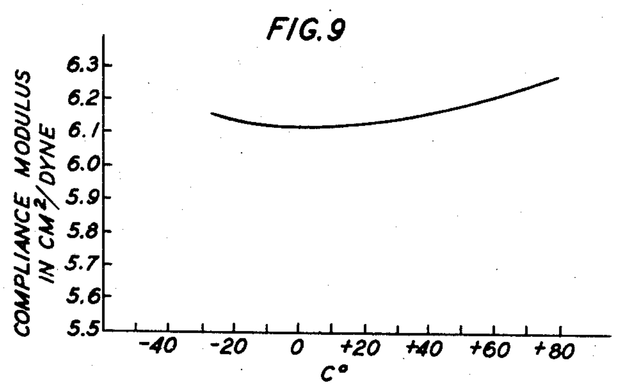
Figure 10:
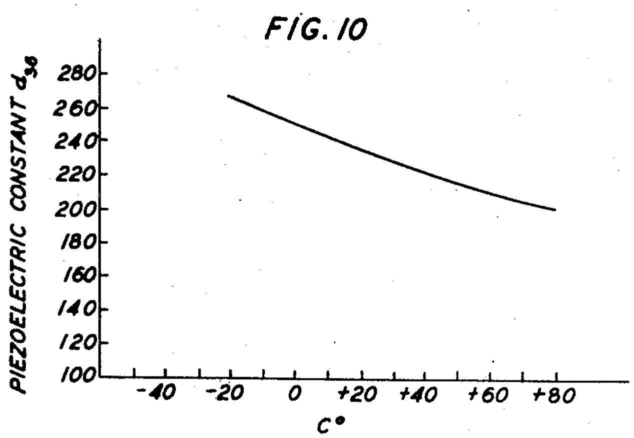

Figs. 3A and 3B indicate the hypothetical lattice structure of ammonium-$d_4$ deuterium phosphate;

Figs. 4A and 4B respectively show in perspective and in cross section a circuit element in accordance with the present invention utilizing any one of the rectangular crystal elements described herein;

Figs. 5A and 5B respectively show in perspective and in cross section a circuit element in accordance with the present invention which includes a crystal element cut for torsional vibration;

Figs. 6A, 6B, and 6C respectively show curves indicating the measured resonance frequency, the measured ratio of capacities, and the percentage coupling, each plotted as a function of frequency for several 45 degree Z-cut crystals of various thicknesses of ammonium-$d_4$ deuterium phosphate;

Figs. 7A, 7B, and 7C show curves indicating similar measurements plotted as a function of frequency for each of several nearly square Z-cut crystals of various thicknesses of ammonium-$d_4$ deuterium phosphate;

Fig. 8 shows a curve indicating the dielectric constant in the Z direction for crystalline ammonium-$d_4$ deuterium phosphate plotted as a function of temperature;

Fig. 9 shows a curve indicating the changes in the compliance modulus with temperature of a 45 degree Z-cut crystal of ammonium-$d_4$ deuterium phosphate; and Fig. 10 shows a curve indicating the changes in piezoelectric constant with temperature for ammonium-$d_4$ deuterium phosphate.

Figure 1:
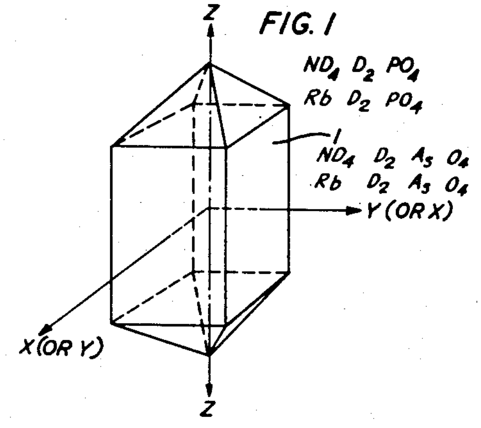
Figure 1 illustrates diagrammatically a crystal of tetragonal habit.
Figure 2:
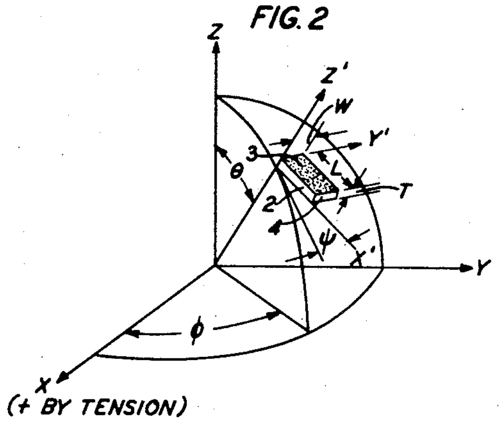
Fig. 2 is a perspective view illustrating the orientation, in terms of the angles $\varphi$, $\theta$, and $\psi$ of a crystal element cut from a mother crystal of the form shown in Fig. 1, and may be taken to illustrate the orientation of any of the crystal elements disclosed herein.

This specification follows the conventional terminology as applied to piezoelectric crystalline substances outlined in "Piezoelectric Crystals and Their Application to Ultrasonics" by W. P. Mason, D. Van Nostrand Company, Inc., 1950. This employs three mutually perpendicular X, Y, and Z axes, as shown in Figs. 1 and 2 of the drawings, to designate an electric axis, a mechanical axis and an optic axis, respectively, of piezoelectric crystalline substances; and also employs as indicated in Fig. 2 three orthogonal axes X', Y', and Z' to designate the directions of the axes of a crystalline piezoelectric body or element that is angularly oriented with respect to such X, Y, and Z axes thereof. The conventional terminology defined in the above reference is also used for designating the elastic constants $s$ and $c$, the piezoelectric constants $d$ and other constants of piezoelectric crystalline substances. As an illustrative example, the $d_{36}$ piezoelectric constant means that a Z-axis field (represented by the numeral 3) will produce XY shear motion (represented by the numeral 6). If the $d_{36}$ piezoelectric constant of the substance has a large value, as it does in the case of the several crystals here considered, then a Z-axis field applied thereto may produce a strong shear motion in the XY plane of the crystal body.

Ammonium-$d_4$ deuterium phosphate crystallizes in the prismatic tetragonal-scalenohedral form shown in Fig. 1, and has six elastic compliances, namely $s_{11}$, $s_{12}$, $s_{13}$, $s_{33}$, $s_{44}$, and $s_{66}$, and two types of piezoelectric constants, namely, $d_{14}=d_{25}$, and $d_{36}$. The elastic, dielectric, and piezoelectric equations for crystalline ammonium -$d_4$ deuterium phosphate, are analagous to those given for corresponding dihydrogen salts in W. P. Mason's article "The Elastic, Piezoelectric, and Dielectric Constants of Potassium Dihydrogen Phosphate, and Ammonium Dihydrogen Phosphate," Physical Review, volume 69, Nos. 5 and 6, March 1 and 15, 1946, page 173.

As indicated in Fig. 1, the crystals of ammonium-$d_4$ deuterium phosphate are formed with four major prism faces and with four cap faces at each end. The optic axis Z extends between the respective apices of the cap faces, and the mutually perpendicular X and Y axes extend perpendicular to the four major prism faces.

Fig. 3A shows the hypothetical lattice structure of ammonium-$d_4$ deuterium phosphate and the related materials disclosed. Fig. 3B shows in more detail the structure of the $PO_4$ group. The lattice structure formed by the phosphate groups, $PO_4$, consists of a phosphorous atom tetrahedrally surrounded by four other phosphate groups. These tetrahedral groups are arranged in triangular groups of three in parallel lateral planes, in alternation with similar groups of the ammonium radical. In transverse parallel planes, the $PO_4$ groups form a series of rectangles in the center of which is an ammonium group arranged in alternation with mixed rectangles including two each of ammonium and phosphate groups, and rectangles formed by ammonium groups with a centered phosphate group.

As represented in Fig. 3B, the deuterium nuclei are assumed to lie between adjacent oxygens in neighboring $PO_4$ groups, one near the top, and the other near the bottom, the block circles indicating filled positions, and the dotted circles vacated positions.

Applicants have found that ammonium-$d_4$ deuterium phosphate has a transition temperature at 242° K. (−31° C.), as compared to a transition temperature of 140° K. for ammonium dihydrogen phosphate. It has been further demonstrated by applicants that the high values of dielectric constant, piezoelectric constant and coupling coefficient which are characteristic of the transition temperature in the latter substance, and the zero temperature coefficient of frequency which is present in the 45 degree Z-cut and the Z-cut face-shear mode crystal near the transition temperature, all appear in the same relation in the characteristic of the deuterium salt in a range 102 degrees higher, much closer to the room temperature region. This is of considerable interest in many practical applications of the invention.

The seed crystals can be prepared by reacting stoichiometric amounts of heavy ammonia and heavy water, both of which can be obtained commercially, in accordance with the formula $$2ND_4OD+D_2O+P_2O_5\rightarrow 2ND_4D_2PO_4 \quad (1)$$

The reactants are heated in a Petrie dish to approximately 30° C., after which the temperature is gradually decreased to room temperature.

From the seed crystals so produced, mother crystals of the type indicated in Fig. 1 of the drawings may be grown in any suitable manner known in the art, such as the circulation method or the rocking method. Further details of a method of growing crystals of the type desired are disclosed in W. P. Mason Patent 2,450,010, September 28, 1948.

Fig. 2 is a diagram illustrating the system, recently defined by the Institute of Radio Engineers, for specifying the orientation for a piezoelectric crystal element or body 2 in relation to its mutually perpendicular X, Y, and Z axes. As shown in Fig. 2, the X' axis is taken along the length dimension L of the crystal element 2, the Y' axis is taken along the width dimension W of the crystal element 2, and the Z' axis is taken along the thickness dimension T of the crystal element 2. The angle $\theta$ is, as shown in Fig. 2, the angle between the optic axis Z and the plate normal or Z' axis, and the angle $\varphi$ is the angle between the +X axis and the intersection of the plane containing the Z and Z' axes with the XY plane, while $\psi$ is the angle between the length axis X' and the tangent of the great circle containing the Z and Z' axes as measured in a plane perpendicular to the Z' axis. All angles are positive when measured in a counter-clockwise direction. Fig. 2 is applicable to a right-hand crystal, such as quartz, following the crystallographer's definition and the earlier Biot convention. The positive (+) X axis is the X axis for which a positive charge develops under application of a tensional stress thereto.

By specifying the values for the three angles $\theta$, $\varphi$, and $\psi$ of Fig. 2 one may generally designate the orientation of the various crystal elements disclosed in this specification.

For the purpose of the present invention, the piezoelectric crystal elements cut from the mother crystal may assume any of the forms described in the art with reference to the isomorphous hydrogen salts, and more particularly, any of the piezoelectric crystal cuts of ammonium dihydrogen phosphate disclosed in detail in certain of prior patents to W. P. Mason mentioned hereinafter.

Crystal elements of suitable orientation cut from crystalline ammonium-$d_4$ deuterium phosphate, may be excited in different modes of motion, such as longitudinal length, longitudinal width or longitudinal thickness modes of motion, face-shear modes of motion controlled mainly by the width and length major face dimensions, or thickness-shear modes of motion controlled mainly by the thickness dimension. Also, low frequency flexural modes of motion of either the width bending flexure type or the thickness bending flexure type may be utilized. The contour or face modes of motion may be either the face-shear mode of motion, or the width or length face longitudinal modes of motion. The thickness modes of motion may be either the thickness-longitudinal mode of motion or the thickness-shear mode of motion. These modes of motion are similar in the general form of their motion to those modes of corresponding names that are already known in connection with quartz, Rochelle salt, ammonium dihydrogen phosphate, and other known piezoelectric crystals.

The types of crystal cuts may be divided into several categories, such as (*a*) crystal cuts that have relatively large piezoelectric constants, and hence may be driven strongly piezoelectrically, (*b*) crystal cuts that have advantageous elastic properties, such that the longitudinal-face modes or motion therein are free from coupling to the face-shear modes of motion therein, and face-shear mode crystal elements that are free from coupling with other modes of motion therein, or (*c*) crystal cuts that may have the relatively lower values of temperature coefficients of frequency.

For example, thickness-shear mode crystal elements of the types disclosed in Figs. 3 to 5 of W. P. Mason Patent 2,484,635, October 11, 1949, comprising 45 degree X-cut, Y-cut, and Z-cut crystals, may be utilized at the relatively high thickness mode frequencies, fundamental or harmonic, to generate high frequency waves in liquids, and may also be used as frequency control elements, in electric wave filter systems, oscillation generator systems, and for other purposes where a relatively high frequency or thickness mode crystal element may be desired.

The X-cut, Y-cut, and Z-cut face-shear mode crystals, which are disclosed in Fig. 3 of W. P. Mason Patent 2,450,010, are controlled by the $d_{14}$, the $d_{25}$, and $d_{36}$ piezoelectric constants, respectively, following the conventional terminology used for expressing the relation between the applied field direction and the resulting stress or type of motion. Since in ammonium-$d_4$ deuterium phosphate and isomorphous substances, the $d_{36}$ piezoelectric constant is of larger value than the $d_{14}$ and $d_{25}$ piezoelectric constants, thereof, the Z-cut face-shear mode crystal element may be driven more strongly than the X-cut or Y-cut face-shear mode crystal elements.

A longitudinal-thickness mode piezoelectric crystal element, such as disclosed in Fig. 3 of W. P. Mason Patent 2,450,011, September 28, 1948, may be used, for example, to generate high frequency longitudinal waves in liquids as in high frequency supersonic projectors, and for other purposes where a relatively high frequency crystal element may be desired. The longitudinal mode of motion coupled to the thickness mode of motion utilized in the thickness mode crystal element shown in Fig. 3 of Patent 2,450,011 supra is controlled by the piezoelectric constant $d_{33}'$.

Suitable conductive electrodes such as the crystal electrodes 3 and 4 may be placed on or adjacent to or formed integral with the opposite major faces of any one of the rectangular crystal plates disclosed hereinbefore for the purpose of applying electric field excitation thereto, as illustrated in Figs. 4A and 4B which respectively show in perspective and in cross section a piezoelectric element in accordance with the present invention including one of the rectangular crystal cuts described in the preceding paragraphs. The electrodes 13 and 14, when formed integral with the surfaces of any of the crystal elements 2, may consist of gold, platinum, aluminum, silver or other suitable conductive material deposited upon the crystal surfaces by evaporation in vacuum, painting, spraying, or by other suitable process. The crystal element 2 may be electroplated to the desired thickness by nickel plating or otherwise. Moreover, such crystal elements, may be mounted and electrically connected by any suitable means, such as for example, by pressure type clamping pins or by conductive supporting wires 15 and 16 cemented to the crystal coatings at or near the nodal regions, in a manner used with quartz, Rochelle salt, and other crystals similar or corresponding modes of motion.

Figs. 5A and 5B of the drawings show in perspective and in cross section another alternative form of the invention comprising a torsional vibrator of the general form disclosed in W. P. Mason Patent 2,518,348, August 8, 1950. This embodiment may be utilized in mechanical filters as a unit for driving small diameter rods to vibrate torsionally. The vibrator shown comprises a hollow cylinder 20 of piezoelectric material, comprising ammonium-$d_4$ deuterium phosphate, so cut from the original crystal material that the axis of the symmetry of the cylinder and its axial bore 21 coincide with the X (or Y) axis of the crystal. The walls of the axial bore 21 are provided with an electrode 22 as by plating or coating with an evaporated metallic material such as gold. Electrical connection is made between this inner electrode 22 and an external contact point by a narrow strip of baked-on silver paint which extends from one end of the inner periphery of axial bore 21 to a centrally located nodal point on the external cylindrical surface.

Electrode plates 23 and 24, also on the external surface of the crystal 20, substantially cover two opposite quadrants of 90 degrees, each of which is bisected by the Z crystal axis. These electrodes may be applied with ordinary silver paint, baked on the surface in the manner of the external connection to electrode 22, or in any other manner well known in the art. A flange 25 integrally machined with a concentric rod 26 is cemented to the hollow cylinder 20 at the opposite end to the connection to inner electrode 22. The flange 25 makes electrical connection between external conducting electrodes 23 and 24 and the grounded torsional rod 26. When an electric voltage is applied between the inside high-potential electrode 22 and both external electrodes 23 and 24, the cylindrical crystal 20 responds in torsion, each end face turning about the crystal axis with respect to the other end face, a nodal plane being located midway between the ends of the cylinder.

Two of the principal cuts of interest for crystals of the symmetry of ammonium-$d_4$ deuterium phosphate are the 45 degree Z-cut crystal, which is useful for obtaining longitudinal vibrations, and the Z-cut crystal which is useful for face-shear and torsional vibrations. One crystal of each of these types was measured over a temperature range from −25° C. to +80° C. The 45 degree Z-cut crystal used in the measurements had the following dimensions: length =0.592 centimeter, width =1.56 centimeters, and thickness =0.0995 centimeter. The resonant and antiresonant frequencies were measured, and the ratio of capacities was determined from the following formula: (page 67, "Piezoelectric Crystals and Their Application to Ultrasonics," W. P. Mason, D. Van Nostrand Company, Inc., 1950)

$$\frac{1}{r}=\frac{f_A^2}{f_R^2}-1=\frac{2(f_A-f_R)}{f_R} \quad (2)$$

where $f_A$=antiresonant frequency;
$f_R$=resonant frequency;

and $r$=ratio of the capacities.

Figs. 6A and 6B respectively show values for the measured resonant frequency, and the measured ratio of capacities of the 45 degree Z-cut crystal plotted against temperature. The electromechanical coupling factor $k$ can be determined from the ratio of capacities from the following formula: (page 151, "Piezoelectric Crystals and Their Application to Ultrasonics," W. P. Mason, Van Nostrand Company, Inc., 1950)

$$k=\frac{1}{\sqrt{1+\frac{8}{\pi^2}r}} \quad (3)$$

Fig. 6C shows values for this factor plotted against temperature.

Similar measurements indicated in Figs. 7A, 7B, and 7C of the drawings for a nearly square Z-cut crystal vibrating in a face-shear mode, having the dimensions, length =0.527 centimeter, width =0.467 centimeter, and thickness =0.089 centimeter. The resonant frequency has a slight coupling to a thickness flexure mode, but the properties can be approximated by averaging the results in the coupling region. A plot of resonant frequencies against temperature is indicated by Fig. 7A, while Figs. 7B and 7C respectively show plots of the measured ratio of capacities, and the equivalent electromechanical coupling factor.

The dielectric constants of the two crystals referred to in the previous paragraphs were measured at 25° C. and were both found to be about 25.5.

Fig. 8 shows values plotted against temperature for a measurement along the Z axis of the equivalent dielectric constant of ammonium-$d_4$ deuterium phosphate.

Fig. 9 of the drawings shows the values plotted against temperature for the elastic compliance at constant field for the 45 degree Z-cut crystal of ammonium-$d_4$ deuterium phosphate. The elastic compliance $$s^{E'}_{11}$$

is calculated from the following formula: (page 65, "Piezoelectric Crystals and Their Application to Ultrasonics," W. P. Mason, D. Van Nostrand Company, Inc., Equation 5.31)

$$f_R=\frac{1}{2l}\sqrt{\frac{1}{\rho s^{E'}_{11}}} \quad (4)$$

where $f_R$ is the resonant frequency of the crystal, $\rho$ is the density, and $l$, the length of the crystal, is assumed constant over the temperature range.

Fig. 10 shows values of the piezoelectric constant $d_{36}$ for ammonium-$d_4$ deuterium phosphate plotted as a function of temperature. The $d_{36}$ constant of ammonium-$d_4$ deuterium phosphate can be calculated from the data of Figs. 6, 8, and 9 using the following formula: (page 146, "Piezoelectric Crystals and Their Application to Ultrasonics," W. P. Mason, D. Van Nostrand Company, Inc., 1950)

$$\frac{d_{36}}{2}=k\sqrt{\frac{\epsilon^T_{33}}{4\pi}s^{E'}_{11}} \quad (5)$$

These calculated values are plotted in Fig. 10 as a function of temperature. It is apparent from Fig. 10 that the $d_{36}$ constant in ammonium-$d_4$ deuterium phosphate is very large compared to similar prior art crystals, such as ammonium dihydrogen phosphate.

In accordance with the present invention, thallium, or alternatively rubidium in amounts ranging up to the order of five atomic per cent, may be incorporated to advantage in crystals of ammonium-$d_4$ deuterium phosphate. The temperature at which the crystalline element exhibits a zero temperature coefficient of frequency is thereby increased and can be brought up to the room temperature range. The addition of thallium or rubidium also prevents cracking if the temperature should be lowered below the transition temperature of −31° C. In the growing of the mother crystals from seed, the desired percentage of thallium is added to the mother liquid of ammonium-$d_4$ deuterium phosphate, in the form of a saturated aqueous solution of thallium deuterium phosphate, $ThD_2PO_4$, and the crystals are grown in the usual manner at a gradually decreasing temperature. A similar procedure is employed in the case of added rubidium.

What is claimed is:

1. An electrical device comprising in combination a pair of conducting electrodes spaced by a crystalline element of tetragonal lattice structure comprising ammonium-$d_4$ deuterium phosphate.

2. An electromechanical transducer comprising a crystalline element of ammonium-$d_4$ deuterium phosphate, opposing faces of which are coated with a pair of conducting electrodes comprising adherent material formed on the surface of said element.

3. A piezoelectric crystalline element adapted for longitudinal motion along its thickness dimension which is normal to its major faces, said crystalline element comprising ammonium-$d_4$ deuterium phosphate, the normal to the major faces of said crystalline element inclined at substantially equal angles with respect to all three of the mutually perpendicular axes thereof.

4. A piezoelectric crystalline element comprising ammonium-$d_4$ deuterium phosphate adapted for longitudinal motion along its thickness dimension which is normal to its major faces, in which the normal to the major faces of said crystalline element are inclined at substantially equal angles with respect to all three of the mutually perpendicular X, Y, and Z axes thereof.

said thickness dimension being a value corresponding to the value of the frequency for said thickness longitudinal mode of motion, said major faces of said crystal element being substantially rectangular, and means comprising electrodes cooperating with said major faces for operating said crystal element in said thickness longitudinal mode of motion.

5. A piezoelectric crystal apparatus comprising a crystalline element of tetragonal lattice structure comprising ammonium-$d_4$ deuterium phosphate, said apparatus adapted for longitudinal lengthwise motion at a frequency dependent mainly on the value of the longest or length axis dimension thereof, said value of said elongated length axis dimension corresponding to the value of said frequency, said crystalline element having substantially rectangular shaped major faces, the width axis dimension of said major faces being substantially perpendicular to said length axis dimension thereof, and the ratio of said width axis dimension with respect to said length axis dimension being a value less than 0.6, said major faces being disposed substantially perpendicular to the Z axis of the three mutually perpendicular X, Y, and Z axes, and said length axis dimension being inclined at an orientation angle of substantially 45 degrees with respect to said X and Y axes, said orientation angle being a value corresponding to the maximum value of piezoelectric constant for said longitudinal mode of motion, to the maximum value of said motion along said length axis dimension, and substantially to zero value of coupling of said desired longitudinal motion with the undesired face-shear mode of motion in said crystalline element.

6. A piezoelectric crystal element adapted for thickness-shear motion at a frequency controlled mainly by its thickness dimension between its major faces, said element having a tetragonal lattice structure composed of ammonium-$d_4$ deuterium phosphate, said major faces being substantially parallel to one of the three mutually perpendicular X, Y, and Z axes and inclined at the bisecting angle of substantially 45 degrees with respect to the other two of said three X, Y, and Z axes of said crystal element, said angle being a value corresponding to substantially the largest value of piezoelectric constant in said crystal substance for said thickness-shear mode of motion.

7. A piezoelectric crystal element comprising ammonium-$d_4$ deuterium phosphate adapted for thickness-shear motion at a frequency controlled mainly by its thickness dimension between its major faces, said major faces being substantially parallel to one of the three mutually perpendicular X, Y, and Z axes and inclined at a bisecting angle of substantially 45 degrees with respect to the other two of said three X, Y, and Z axes of said crystal element, said angle being a value corresponding to substantially the largest value of piezoelectric constant in said crystal substance for said thickness-shear mode of motion.

8. An electrical filter comprising in combination a dielectric crystalline element of ammonium-$d_4$ deuterium phosphate, and a pair of conducting electrodes in the form of adherent material coatings on opposite faces of said element.

9. A piezoelectric apparatus comprising a hollow cylinder of crystalline material of ammonium-$d_4$ deuterium phosphate, said cylinder having it longitudinal axis normal to the crystal Z axis and having a longitudinal bore therethrough, conductive electrodes plated on the external cylindrical surfaces normal to said longitudinal axis and to the crystal Z axis, and an internal electrode in said longitudinal bore.

10. A device adapted for piezoelectric oscillation and having a frequency-temperature coefficient that is zero at a temperature between zero and 50° C., said device comprising a crystalline element of tetragonal lattice structure composed of tetrahedral units linked together with deuterium bonds, and having the general formula $XD_2YO_4$, where X is a material selected from the group Rb, or $ND_4$, and Y is a material selected from the group P or As.

11. A device in accordance with claim 10 in which said crystalline element contains amounts of thallium up to five per cent.

12. A device adapted for piezoelectric oscillation and having a substantially zero frequency-temperature coefficient within the range 0° C. to 50° C inclusive, said device comprising a crystalline element of tetragonal lattice structure comprising ammonium-$d_4$ deuterium phosphate which contains amounts of thallium up to five per cent.

WARREN P. MASON.
BERND T. MATTHIAS.

References Cited in the file of this patent

UNITED STATES PATENTS

| Number | Name | Date |
|---|---|---|
| 2,188,154 | Morgan | Jan. 23, 1940 |
| 2,463,109 | Jaffe | Mar. 1, 1949 |
| 2,625,663 | Howatt | Jan. 13, 1953 |

OTHER REFERENCES

Chemical Abstracts, vol. 39, No. 24, December 20, 1945, pages 5874, 5875.